United States Patent
Jiang et al.

(10) Patent No.: US 9,615,386 B2
(45) Date of Patent: Apr. 4, 2017

(54) RANDOM ACCESS CHANNEL FALSE ALARM CONTROL

(71) Applicant: TEXAS INSTRUMENTS INCORPORATED, Dallas, TX (US)

(72) Inventors: Jing Jiang, Wellesley, MA (US); Mingjian Yan, Gaithersburg, MD (US); Aleksandar Purkovic, Potomac, MD (US); Constantin Bajenaru, Brookline, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 72 days.

(21) Appl. No.: 14/591,588

(22) Filed: Jan. 7, 2015

(65) Prior Publication Data
US 2015/0215968 A1  Jul. 30, 2015

Related U.S. Application Data

(60) Provisional application No. 61/932,082, filed on Jan. 27, 2014.

(51) Int. Cl.
*H04W 4/00* (2009.01)
*H04W 74/08* (2009.01)
*H04W 74/00* (2009.01)

(52) U.S. Cl.
CPC ..... *H04W 74/0833* (2013.01); *H04W 74/004* (2013.01)

(58) Field of Classification Search
USPC .......................... 370/230, 236, 252, 328, 350
See application file for complete search history.

(56) References Cited

U.S. PATENT DOCUMENTS

| | | | |
|---|---|---|---|
| 8,005,155 B1 * | 8/2011 | Lee | H04L 27/2647 370/509 |
| 8,064,546 B2 | 11/2011 | Jiang et al. | |
| 8,538,322 B1 * | 9/2013 | Antonio | H04W 24/04 370/252 |
| 2006/0269024 A1 * | 11/2006 | Dominique | H04B 1/7115 375/350 |
| 2007/0183370 A1 * | 8/2007 | Wallace | H04L 27/0014 370/333 |
| 2009/0028065 A1 * | 1/2009 | Iwai | H04J 13/0055 370/252 |

(Continued)

OTHER PUBLICATIONS

3GPP, Technical Specification, TS35,104, Base Station (BS) Radio Transmission and Reception (Release 10), V10,10.0, Mar. 2013.

*Primary Examiner* — Kwang B Yao
*Assistant Examiner* — Nguyen Ngo
(74) *Attorney, Agent, or Firm* — Ronald O. Neerings; Charles A. Brill; Frank D. Cimino (57) ABSTRACT

A wireless device includes a preamble detector configured to identify preambles transmitted via a random access channel of a wireless network. The preamble detector includes preamble false alarm logic. The preamble false alarm logic is configured to set a preamble false alarm detection window, and compare, to one another, preambles identified in the false alarm detection window. The preamble false alarm logic is configured to identify, based on the comparison, a largest of the preambles in the false alarm detection window, and reject all but the identified largest of the preambles as false alarm detections.

23 Claims, 5 Drawing Sheets

(56) References Cited

U.S. PATENT DOCUMENTS

| | | | | |
|---|---|---|---|---|
| 2009/0040918 A1* | 2/2009 | Jiang | ............ | H04B 1/59 |
| | | | | 370/210 |
| 2010/0203885 A1* | 8/2010 | Chen | ............ | H04W 48/20 |
| | | | | 455/434 |
| 2012/0295657 A1* | 11/2012 | Okazaki | ............ | H04W 56/00 |
| | | | | 455/524 |
| 2014/0226471 A1* | 8/2014 | Chaudhuri | ............ | H04W 74/0833 |
| | | | | 370/230 |
| 2015/0180695 A1* | 6/2015 | Hashizume | ............ | H04L 5/0044 |
| | | | | 370/329 |

* cited by examiner

FIG. 6

RANDOM ACCESS CHANNEL FALSE ALARM CONTROL

CROSS-REFERENCE TO RELATED APPLICATIONS

The present application claims priority to U.S. Provisional Patent Application No. 61/932,082, entitled "PRACH False Alarm Control in LTE Networks," filed Jan. 27, 2014; which is hereby incorporated by reference in its entirely.

BACKGROUND

In some wireless networks, long term evolution (LTE) networks being one example, user equipment (UE) obtains uplink synchronization by transmitting a preamble to a base station (or evolved Node B, eNB) via a physical random access channel (PRACH). The preambles used in the PRACH are constant-amplitude Zadoff-Chu (ZC) sequences of a prime length, such that the cyclic auto-correlation of the ZC sequence is an ideal delta function and the cyclic cross-correlation of two ZC sequences with different root sequence indices is a constant of magnitude $$\frac{1}{\sqrt{N_{ZC}}},$$

where $N_{ZC}$ is the ZC sequence length. At the base station, network resources are allocated responsive to preamble detection.

SUMMARY

An apparatus and method for reducing false detection of preambles in the physical random access channel (PRACH) of a wireless network are disclosed herein. In one embodiment, a wireless device includes a preamble detector configured to identify preambles transmitted via a random access channel of a wireless network. The preamble detector includes preamble false alarm logic. The preamble false alarm logic is configured to set a preamble false alarm detection window, and compare, to one another, preambles identified in the false alarm detection window. The preamble false alarm logic is configured to identify, based on the comparison, a largest of the preambles in the false alarm detection window, and reject all but the identified largest of the preambles as false alarm detections.

In another embodiment, a method includes identifying preambles transmitted via a random access channel of a wireless network. The identifying includes setting a preamble false alarm detection window. The preambles identified in the false alarm detection window are compared to one another. Based on the comparison, a largest of the preambles in the false alarm detection window is identified. All but the identified largest of the preambles are rejected as false alarm detections.

In a further embodiment, a wireless device includes a preamble detector configured to identify preambles transmitted via a random access channel of a wireless network. The preamble detector includes preamble false alarm logic configured to: set a preamble false alarm detection threshold; compare to the preamble false alarm detection threshold each of the preambles identified by the preamble detector; and reject each of the preambles that does not exceed the false alarm detection window as a false alarm detection. The preamble false alarm detection logic is also configured to: set a preamble false alarm detection window; compare, to one another, preambles identified in the false alarm detection window; identify, based on the comparison, a largest of the preambles in the false alarm detection window; and reject all but the identified largest of the preambles as a false alarm detection.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Because preamble detection triggers allocation of network resources, minimization of erroneous preamble detection is desirable. For example, long term evolution (LTE) networks standards dictate that the number of preambles falsely detected in the physical random access channel (PRACH) should not exceed 0.1% of preambles detected in additive white Gaussian channel when no preamble is transmitted. In practice, especially in networks that include small cells, strong uplink interference in a cell can result from transmissions by User Equipment (UE) connected to neighboring cells. The precise statistical characteristics of such interference may be difficult to determine. In addition, due to limited processing gain, correlation-based preamble detection may be relatively ineffective in the presence of energy leakage caused by an individual preamble transmitted at high power. Such high-power preambles, and/or the deviation of interference statistics from additive white Gaussian noise (AWGN), make the false alarm rate at the base station excessive.

Embodiments of the present disclosure include a base station that provides improved false alarm control in the PRACH of a wireless network. The false alarm control system disclosed herein applies a dynamically adjusted false alarm preamble detection threshold and a dynamically adjusted false alarm detection window that reduce the number of false preamble detections. The length of the false alarm detection window may be set based on the signal to interference plus noise (SINR) ratio of preambles detected within the window. The preamble detection threshold may be set based on average in-band noise and interference power. The false alarm preamble detection threshold reduces erroneous preamble detection due to interference. The false alarm detection window protects against erroneous preamble detection caused by high power preamble transmissions.

Figure 1:
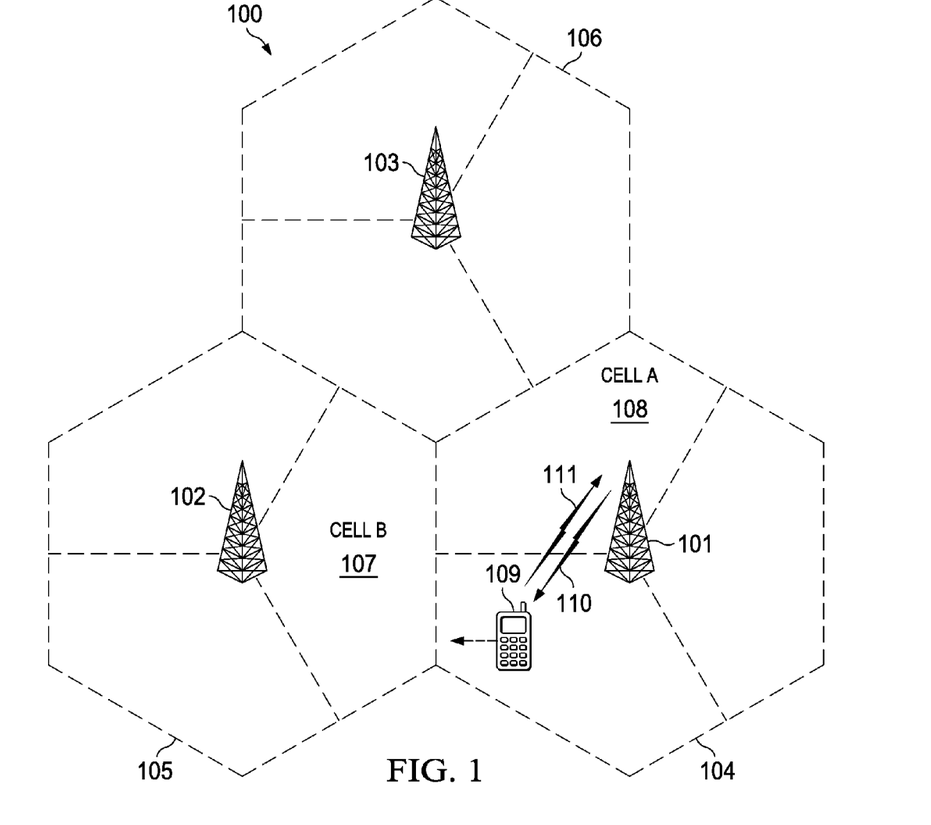
FIG. 1 shows a schematic diagram of a wireless network in accordance with various embodiments.

FIG. 1 shows a block diagram of a wireless network 100 in accordance with various embodiments. The illustrative wireless network includes base stations 101, 102 and 103, though in practice, embodiments of the network 100 may include any number of base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, e.g., traffic data, measurements reports, tracking area updates, etc., UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction.

After receiving the resource allocation and a possible timing advance message transmitted on down-link 110 by base station 101, UE 109 optionally adjusts its transmit timing and transmits the data on up-link 111 employing the allotted resources during the prescribed time interval.

Various embodiments of the network 100 operate in compliance with the long term evolution (LTE) networking standards. Accordingly, UE 109 obtains uplink synchronization by transmitting a preamble to base station 101 via a physical random access channel (PRACH). The preamble includes Zadoff-Chu (ZC) sequences of prime length. Such sequences possess ideal periodic autocorrelation and optimum periodic cross-correlation. The preamble can be a root ZC sequence or a cyclic shifted version of a root ZC sequence.

The base stations 101, 102, 103 include preamble detectors that identify preambles transmitted by a UE. Responsive to preamble detection, a base station 101, 102, 103 allocates network resources to the UE. False preamble detections (i.e., detection of a preamble transmission when no preamble is actually transmitted by a UE) can result in unnecessary and wasteful allocation of network resources. False preamble detections can result, for example, from strong uplink interference from transmissions by a UE connected to a neighboring cell, or from energy leakage caused by a preamble transmitted at high power.

The preamble detectors provided in the base stations 101, 102, 103 include false alarm detection that distinguishes actual preamble transmissions from false alarm detections, which in turn reduces wasteful allocation of network resources. The preamble detectors apply dynamically adjusted thresholding and windowing to identify false preamble detections.

Figure 2:
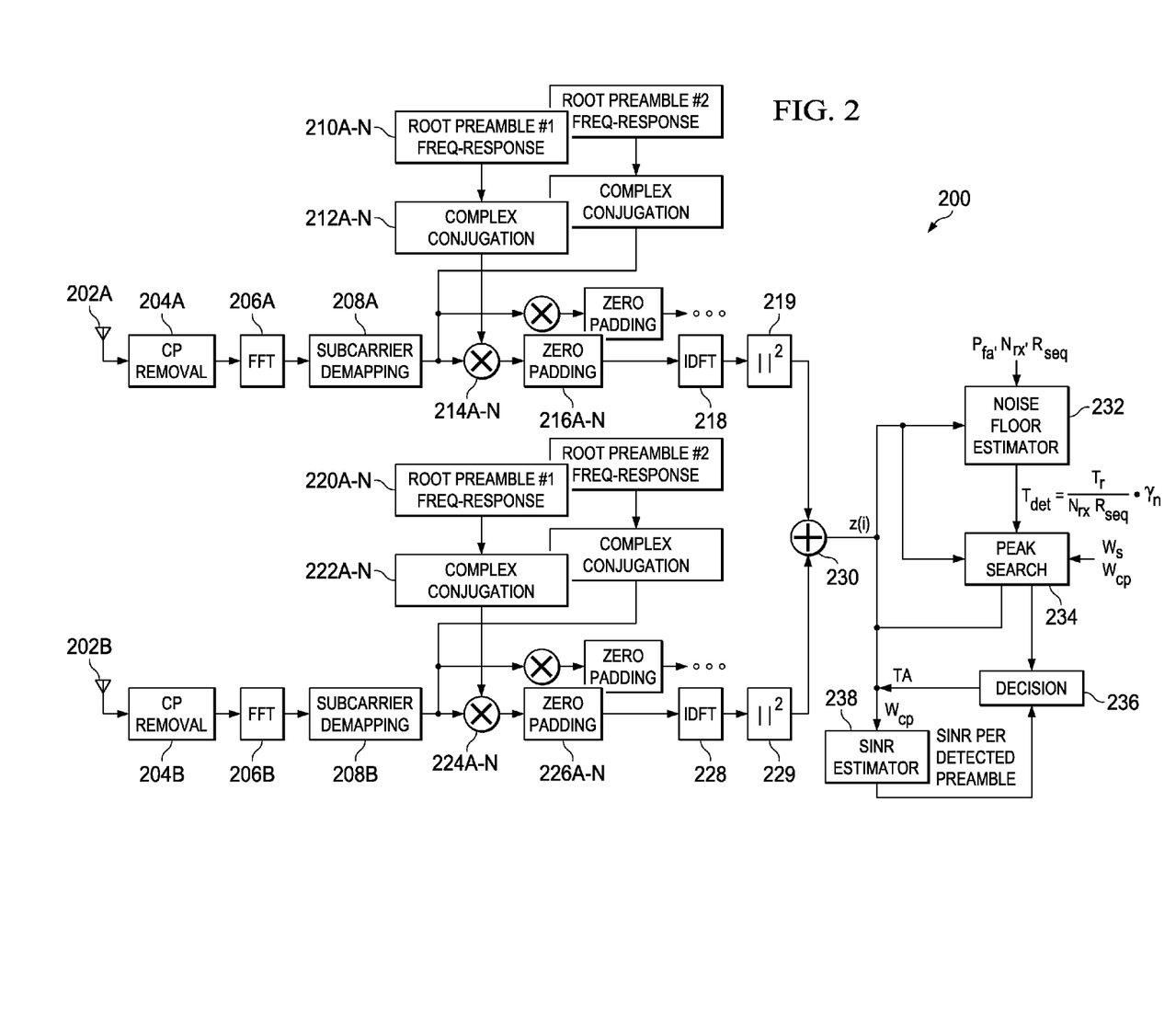
FIG. 2 shows a block diagram of a preamble detector for use in a base station of a wireless network in accordance with various embodiments.

FIG. 2 shows a block diagram of a preamble detector 200, in accordance with various embodiments, that is included in a base station (e.g., base station 101) of the wireless network 100. In preamble detector 200, radio frequency signal is received via antennas 202A, 202B. The received signals are digitized, and cyclic prefix (CP) removers 204a, 204b remove the cyclic prefixes from the received signals. After cyclic prefix removal, the signals are converted to frequency domain by frequency domain transformers 206a, 206b. A discrete Fourier transform of size corresponding to either the entire preamble length or its constituent sequence length may be performed depending on whether coherent or non-coherent accumulation is used. Subcarrier demappers 208a, 208b extract the subcarriers used by preambles in the frequency domain. In the frequency domain embodiments, one preamble detector can be used to detect all signatures based on one root preamble sequence.

The received signal is correlated with all available root preamble sequences to detect UE preamble transmissions. Each available root preamble sequence includes a corresponding root preamble frequency response 210A-210N, 220A-220N. The preamble detector 200 of FIG. 2 includes two root preamble sequences. Other embodiments of the preamble detector 200 may include more than two root preamble sequences. Complex conjugators 212A-212N, 222A-222N compute complex conjugates of the root preamble frequency responses 210A-210N, 220A-220N, and multipliers 214A-214N, 224A-224N multiply subcarrier by subcarrier the demapped subcarriers with the complex conjugates of the root preamble sequences to perform the correlation.

PRACH preamble detection in the preamble detector 200 uses power sample based processing that compares each power sample with a preamble detection threshold. The base station declares corresponding detected signatures and estimates associated UE delays for any power samples exceeding the detection threshold. Embodiments of the preamble detector 200 generalize sample-based preamble detection using a sliding window of data of CP duration. Instead of each power sample, the received preamble energy within the sliding window is compared with a preamble detection threshold defined as:

$$T_{det} = \frac{T_r}{N_{rx}R_{seq}}\gamma_n \quad (1)$$

where:

$T_{det}$ is the absolute preamble detection threshold;

$$\frac{T_r}{N_{rx}R_{seq}}$$

is the predetermined relative preamble detection threshold based on a predefined false alarm probability when no preamble is transmitted;

$N_{rx}$ is the number of receive antennas;

$R_{seq}$ is the number of sequence repetitions; and $\gamma_n$ is the noise floor estimate.

The sample based approach can be viewed as a special case of the sliding window based approach with a sliding window of one sample. The window can be the result of a windowing filter such as a unit impulse window filter, a rectangular window filter, a triangular window filter, a Hamming window filter, a Hann window filter, a cosine window filter, a Lanczos window filter, a Bartlett window filter, a Gauss window filter, a Bartlett-Hann window filter, a Blackman window filter, a Kaiser window filter, etc. Filter taps of the window filter may be computed adaptively.

The preamble detector 200 up-samples the preamble by zero padding the correlations, at zero padders 216A-216N, 226A-226N, in the frequency domain such that signal length is a power of 2. The inverse frequency transformers 218, 228 convert the frequency domain signals to time domain signals. Signal power converters 219, 229, compute the square of the absolute value of the time-domain signal, summer 230 sums the resultant power signals.

The noise floor estimator 232, peak searcher 234, and SINR estimator 238 operate on time domain signals. The preamble detection threshold $T_{det}$ is derived assuming a predefined false alarm probability when no preamble is transmitted. With sliding window based preamble detection, the preamble detection threshold is a straightforward extension of the single sample case with a sliding window length $W_{CP}$ of $W_{CP} > L$ samples, where L is the preamble upsampling ratio.

The noise floor estimator 232 may generate two different noise floor estimates based on the time domain power samples provided by the summer 230. A first noise floor estimate $\gamma_n$ is generated for use in preamble detection, and a second noise floor estimate $\hat{\gamma}_n$, that is different from $\gamma_n$, is generated for use in SINR computation after preamble detection. For computation of noise floor $\gamma_n$, the noise floor estimator may compute a noise floor threshold as:

$$T_n = \frac{F_z^{-1}(1-P_{fa})}{N_{rx}R_{seq}} \cdot \frac{1}{N_{IDFT}} \sum_{i=1}^{N_{IDFT}} z(i) \quad (2)$$

where:

$P_{fa}$ is a predefined PRACH false alarm rate;

$N_{IDFT}$ is the size of the inverse transform performed at the transformers 218, 228;

$z(i)$ are power samples generated by summer 230; and $$F_z(z) = 1 - e^{-z} \sum_{k=0}^{N_{rx}R_{seq}-1} \frac{1}{k!} z^k \quad (3)$$

is the cumulative distribution function (CDF) for central chi-square distribution with additive white Gaussian noise input. The quantity $$\frac{F_z^{-1}(1-P_{fa})}{N_{rx}R_{seq}}$$

is the predetermined normalized relative noise floor threshold based on a predefined false alarm rate.

Applying the noise floor threshold $T_n$, the noise floor estimator computes the noise floor $\gamma_n$ as average power below the noise floor threshold $T_n$:

$$\gamma_n = \frac{1}{N_s} \sum_{\substack{i=1, \\ z(i)<T_n}}^{N_{IDFT}} z(i) \quad (4)$$

where:

$N_s$ is the number of samples $z(i)$ summed.

The SINR estimator 238 generates an SINR estimate based on the noise floor estimate $\hat{\gamma}_n$ provided by the noise floor estimator 232. The base station may apply the SINR estimate to generate, and transmit to the user equipment, a power control value for use by the user equipment in uplink shared channel (ULSCH) transmissions. For each preamble detected by the preamble detector 200, the SINR estimator 238 may generate an SINR estimate. In some embodiments, the SINR of each preamble may be computed as:

$$\text{SINR}(k,j) = \max\left(0, \frac{E_{cp}(k,j) - W_{cp}\sum_{i \ne j} I_{cc}(i)}{N_{comb}R_{seq}N_{rx}\hat{\gamma}_n(j)} - W_{cp}\right) \times \frac{N_{comb}}{\alpha N_{seq}} \quad (5)$$

where:

$E_{cp}(k,j)$ is the received energy within $W_{cp}$ the detected preamble;

$$\sum_{i \ne j} I_{cc}(i)$$

is the total cross-correlation interference power received at the j-th root sequence detector from the preambles detected at all other root sequence detectors;

$N_{comb}$ is the number of cyclic-shift combining which is set to 1 for normal cell and to 3 for high-speed cell;

$R_{seq}$ is the number of sequence repetitions;

$N_{rx}$ is the number of receive antennas;

$\hat{\gamma}_n(j)$ is the adjusted noise floor estimate at the j-th root sequence detector;

$N_{seq}$ is the ZC sequence length; and $\alpha$ is the up-sampling ratio in time domain.

The peak search logic 234 receives a noise floor estimate from noise floor estimator 232, the processed data signal from the summer 230, and the values $W_S$, L, and $W_{cp}$, and identifies peaks in the data signal. The peak search 234 provides data on detected peaks to preamble decision logic 236 for preamble detection based on a peak exceeding the preamble detection threshold.

Figure 3:
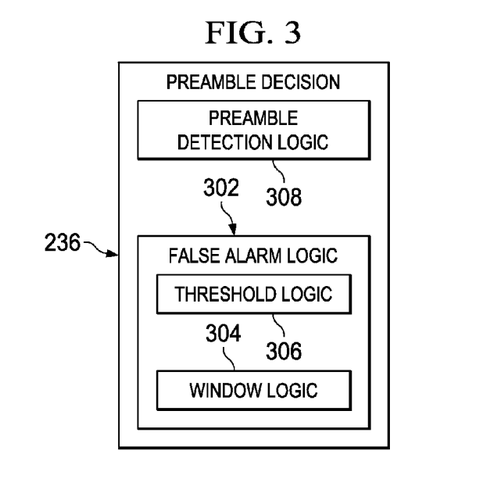
FIG. 3 shows a block diagram of preamble decision logic in accordance with various embodiments.

The preamble decision logic 236 receives SINR estimates from the SINR estimator 238 and peak signal information from the peak search logic 234, and applies the SINR estimates and peak signal information to identify received preambles. FIG. 3 shows a block diagram of the preamble decision logic 236. The preamble decision logic 236 includes preamble detection logic 308 and false alarm logic 302. The preamble detection logic 308 applies the SINR estimates and peak signal information to identify received preambles. For example, the preamble detection logic 308 may compare each power sample with a preamble detection threshold computed as in equation (1) to detect preambles. Some embodiments may apply preamble detection using AWGN-based false alarm control, or other preamble detection methods. The false alarm detection logic 302 evaluates the preambles detected by the preamble detection logic 308 to determine which of the detected preambles may be false alarm detections.

The false alarm logic 302 includes window logic 304 and threshold logic 306. The window logic 304 sets a false alarm window for detection of false alarms and applies the window to identify and reject false alarm preamble detections. The window logic 304 can dynamically set the length of the false alarm window as function of preamble SINR estimates for each detected preamble. Some embodiments of the window logic 304 set the false alarm window length ($W_{FA}$) as:

$$W_{FA} = \min\left(SearchWindowSize, CPWindowSize + sqrt\left(\frac{SINR_{max}}{SINR_{min}}\right)\right) \quad (6)$$

where:
SearchWindowSize is the preamble search window length;
CPWindowSize is cyclic prefix window size;
$SINR_{max}$ is the maximum of the SINR estimate of the detected preamble and the SINR estimate of a second detected preamble that is cyclically closest to the detected preamble; and
$SINR_{min}$ is the minimum of the SINR estimate of the detected preamble and the SINR estimate of a second detected preamble that is cyclically closest to the detected preamble.

Thus, for each detected preamble, the window logic 304 can set the false alarm window length as a function of difference in SINR between a first detected preamble and another detected preamble that is cyclically closest to the first detected preamble. The search window size is used as an upper bound for stability of the method. Some embodiments may compute false alarm window length differently than is described above. For example, various functions of preamble SINR estimates may be used to adjust the false alarm window, the false alarm window may be set to the cyclic prefix length, etc. Within a false alarm window, the false alarm logic 302 may deem only the largest preamble detected to be an authentic preamble. All detected preambles other than the largest preamble may be deemed false alarm detections. Use of the false alarm window protects against false alarms caused by a high-power preamble on the same root sequence in the cyclically adjacent search window. The concept of false alarm window is cyclic in the sense that a false alarm window can start at the end of the last search window and wrap to the start of the first search window on the same root preamble sequence.

The threshold logic 306 can dynamically set a false alarm detection threshold and apply the false alarm detection threshold to identify and reject false alarm preamble detections. The false alarm detection threshold can be dynamically set as a function of noise plus interference power present in the received signals for each root preamble sequence. Some embodiments of the window logic 304 set the false alarm detection threshold ($Thres_{FA}$) as:

$$Thres_{FA} = BaseSINRThres * \left(\frac{AvgInbandPwr}{NormPwr}\right)^{\frac{N_{rx}}{W_{intf}}} \quad (7)$$

where:
BaseSINRThres is a pre-specified baseline false alarm SINR threshold value based on the cell specific configuration at the base station, such as the target false alarm rate, interference level and normality, preamble format, cell type, cyclic shift configuration, and the number of receive antennas;
NormPwr is a pre-specified value of nominal noise power in the PRACH bandwidth;
AvgInbandPwr is measured average noise and interference power in the PRACH bandwidth;
$N_{rx}$ is the number of base station receive antennas; and
$W_{intf}$ is the interference weighting factor. In one embodiment, $W_{intf}$ is a power of 2 for easy implementation (e.g., 8/4/2 for format 0-1/2-3/4).

Thus, some embodiments of the threshold logic 304 can set the false alarm threshold as a function of a ratio of noise plus interference power present in the received signals to nominal noise power. Accordingly, the false alarm threshold increases as measured noise and interference power increases (e.g., non-AWGN interference increases). Applying the false alarm threshold, the false alarm logic 302 may deem only preambles rising above the false alarm threshold to be potentially authentic preambles. All detected preambles not rising above the false alarm threshold may be deemed false alarm detections. Application of the false alarm threshold may control false alarms caused by unknown interference.

Figure 4:
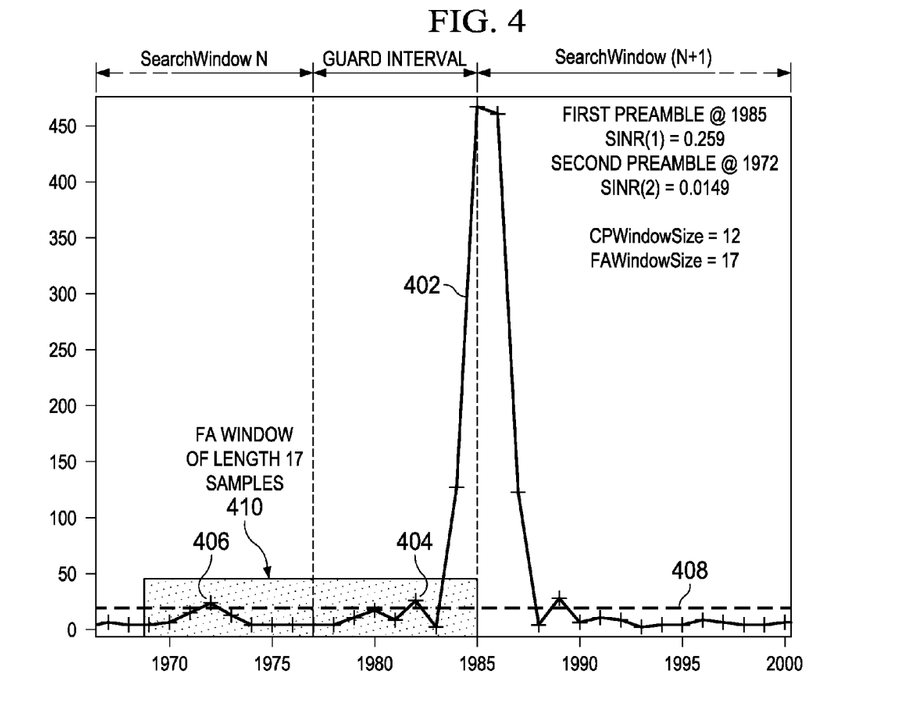
FIG. 4 shows a diagram of preamble signal with false alarms detected in a random access channel in accordance with various embodiments.

FIG. 4 shows a diagram of preamble signal with false alarms detected in a random access channel in accordance with various embodiments. FIG. 4 shows preamble search window N ending at 1976, preamble search window N−1 starting at 1985, and a guard interval between search windows N and N+1 over which no search for preamble is performed. The preamble detection threshold 408 is set according to Equation (1). A first preamble 402 is detected at 1985 as the largest peak exceeding the preamble detection threshold in search window N−1. A second preamble 406 is detected in search window N as the largest peak exceeding the preamble detection threshold. The SINR associated with preamble 408 is 0.259. The SINR associated with preamble 406 is 0.0149. With CPWindowSize of 12 samples, the window logic 304 computes the length of the false alarm window 410 as:

$$W_{FA} = 12 + \text{ceil}\left(sqrt\left(\frac{0.259}{0.0149}\right)\right) = 17 \text{ samples}$$

Preamble 406 falls within the false alarm window 410 of preamble 402. Preamble 406 is deemed a false alarm preamble detection because preamble 406 is not the largest preamble detected in the false alarm detection window 410. A third signal excursion 404 above the false alarm threshold 410 is ignored as falling within the guard interval.

The preamble detector 200 may include a combination of dedicated circuitry and a processor executing instructions to provide the functionality disclosed herein. For example, CP removers 204a, 204b, frequency domain transformers 206a, 206b, and subcarrier demappers 208a, 208b may be implemented by dedicated hardware circuitry. Functionality downstream of the subcarrier demappers 208a, 208b may be implemented via a processor (e.g., a digital signal processor) executing instructions, retrieved from a storage device by the processor, that when executed cause the processor to perform the operations disclosed herein. The noise floor estimator 232, SINR estimator 238, preamble decision logic 236 (including the false alarm logic 302), etc. may be implemented by the processor executing instructions stored in a computer-readable medium, such as a memory.

Figure 5:
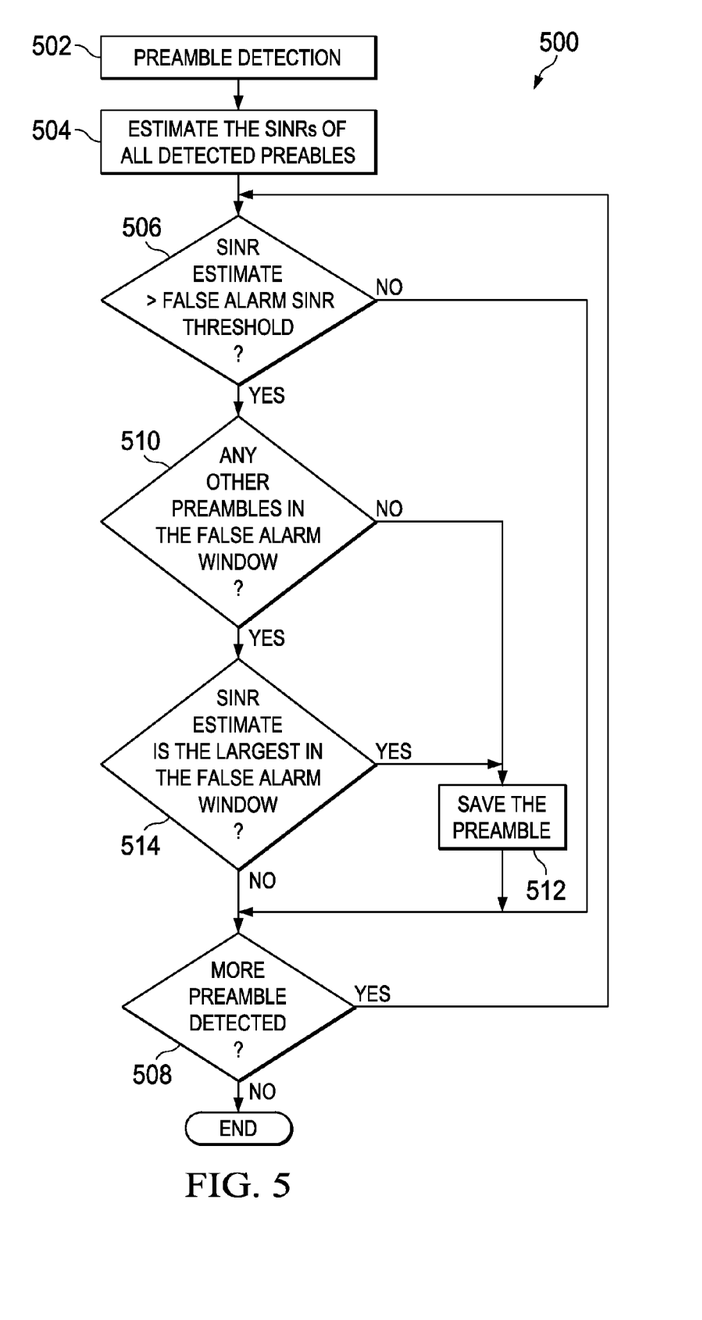
FIGS. 5 and 6 show flow diagrams for methods for preamble detection with false alarm control in a wireless device in accordance with various embodiments.

FIG. 5 shows a flow diagram for a method 500 for preamble detection with false alarm control in the preamble detector 200 in accordance with various embodiments. Though depicted sequentially as a matter of convenience, at least some of the actions shown can be performed in a different order and/or performed in parallel. Additionally, some embodiments may perform only some of the actions shown. At least some of the operations of the method 500 may be performed by a processor executing instructions retrieved from a non-transitory computer readable storage medium.

In block 502, the preamble detector 200 is operating as a component of a base station (e.g., base station 101 in the network 100. The preamble detector 200 is receiving wireless signals transmitted by user equipment, and detecting preambles transmitted by the user equipment at each of a plurality of root sequences. Some of the detected preambles may be false detections. The false alarm detection threshold for each root preamble sequence is computed.

In block 504, the SINR estimator 238 generates an SINR estimate for each detected preamble. False alarm window length for each detected preamble is computed.

Starting from block 506, all the detected preambles are checked one by one. In block 506, the false alarm logic 302 compares the SINR estimate for one of the detected preambles to the current false alarm threshold value. If the preamble SINR estimate is less than the false alarm threshold value, then the preamble is deemed a false alarm detection and discarded.

In block 508, the false alarm logic 302 determines whether additional preambles have been detected. If additional preambles have been detected, then the next preamble is compared to the current false alarm threshold in block 506.

If, in block 506, the preamble compared to the false alarm threshold exceeds the false alarm threshold, then, in block 510, the false alarm logic 302 determines whether any other preamble has been detected in the false alarm window of the preamble currently being checked. If no other preamble was detected in the false alarm window of the preamble currently being checked, then the preamble currently being checked is deemed authentic and the preamble, and associated information such as preamble IDs, delay, SINR estimate, etc., is saved for further processing in block 512.

If, in block 510, it is determined that more than one preamble has been detected in the false alarm window, then in block 514, the false alarm logic 302 determines whether the preamble currently being checked has the largest SINR estimate among the preambles detected in the false alarm window. If the preamble currently being checked has the largest SINR estimate among the preambles detected in the false alarm window, then the preamble currently being checked is deemed authentic and saved for further processing in block 512. Otherwise, the preamble currently being checked is deemed a false alarm detection and discarded. The processing continues in block 508.

Figure 6:
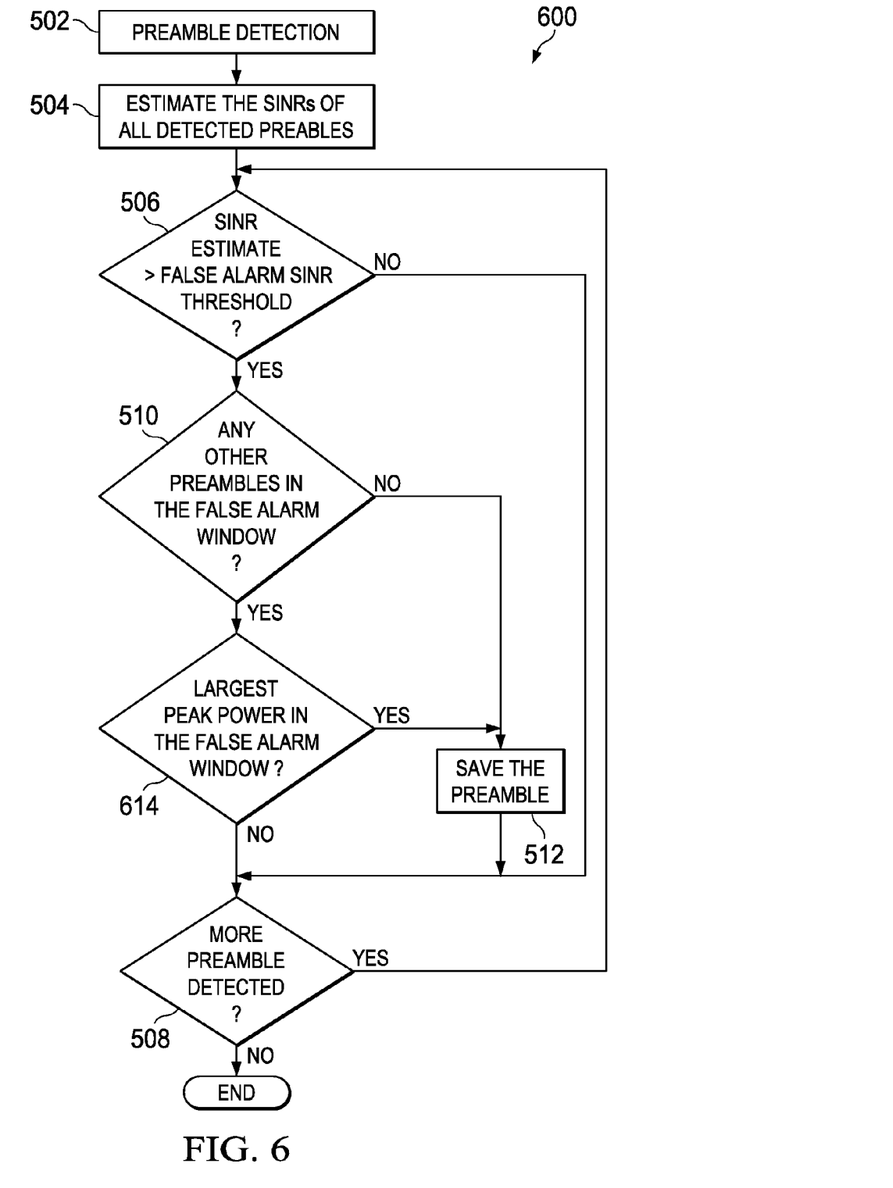

FIG. 6 shows a flow diagram for another method for preamble detection with false alarm control in the preamble detector 200 in accordance with various embodiments. Though depicted sequentially as a matter of convenience, at least some of the actions shown can be performed in a different order and/or performed in parallel. Additionally, some embodiments may perform only some of the actions shown. At least some of the operations of the method 600 may be performed by a processor executing instructions retrieved from a non-transitory computer readable storage medium.

The operations of blocks 502-512 of the method 600 are as described with respect to the method 500 of FIG. 5. The method 600 differs from the method 500 in that peak power, rather than SINR, is used to identify an authentic preamble if multiple preambles are detected in the false alarm window.

In method 600, if, in block 510, it is determined that more than one preamble has been detected in the false alarm window, then in block 614, the false alarm logic 302 determines whether the preamble currently being checked has the largest peak power among the preambles detected in the false alarm window. If the preamble currently being checked has the largest peak power among the preambles detected in the false alarm window, then the preamble currently being checked is deemed authentic and saved for further processing in block 512. Otherwise, the preamble currently being checked is deemed a false alarm detection and discarded. The processing continues in block 508.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
  a preamble detector configured to identify preambles transmitted via a random access channel of a wireless network, the preamble detector comprising:
    preamble false alarm logic configured to:
      set a preamble false alarm detection window;
      compare, to one another, preambles identified in the false alarm detection window;
      identify, based on the comparison, a largest of the preambles in the false alarm detection window; and
      reject all but the identified largest of the preambles as a false alarm detection.

2. The wireless device of claim 1, wherein the preamble false alarm logic is configured to identify the largest of the preambles as one of the preambles having largest peak power in the false alarm detection window.

3. The wireless device of claim 1, wherein the preamble false alarm logic is configured to identify the largest of the preambles as one of the preambles having largest signal to interference plus noise ratio in the false alarm detection window.

4. The wireless device of claim 1, wherein the preamble false alarm logic is configured to:
set a preamble false alarm detection threshold;
compare to the preamble false alarm detection threshold each of the preambles identified by the preamble detector;
reject each of the preambles that does not exceed the false alarm detection threshold as a false alarm detection.

5. The wireless device of claim 4, wherein the preamble false alarm logic is configured to set the false alarm detection threshold as a function of a ratio of average interference plus noise power in the random access channel to a predetermined nominal noise power in the random access channel.

6. The wireless device of claim 4, wherein the preamble false alarm logic is configured to set the false alarm detection threshold as a ratio of average interference plus noise power in the random access channel to a predetermined nominal noise power in the random access channel raised to a power of a ratio of a number of base station receive antennas and an interference weighting factor, wherein the interference weighting factor is a power of 2.

7. The wireless device of claim 1, wherein the preamble false alarm logic is configured to set the preamble false alarm detection window of a first detected preamble as a function of a ratio of measured maximum signal to interference plus noise ratio (SINR) to measured minimum SINR; wherein the maximum SINR is a greatest of a measured SINR of the first detected preamble and a measured SINR of a second detected preamble that is cyclically closest to the first detected preamble; wherein the minimum SINR is a smallest of the measured SINR of the first detected preamble and the measured SINR of the second detected preamble.

8. The wireless device of claim 1, wherein the preamble false alarm logic is configured to set the preamble false alarm detection window to a predetermined length responsive to less than a predetermined level of interference being detected on the random access channel; wherein the predetermined length is based on a cyclic prefix length of shared data channels, upper bounded by the search window length.

9. A method, comprising:
identifying preambles transmitted via a random access channel of a wireless network, the identifying comprising:
setting a preamble false alarm detection window;
comparing, to one another, preambles identified in the false alarm detection window;
identifying, based on the comparison, a largest of the preambles in the false alarm detection window; and
rejecting all but the identified largest of the preambles as false alarm detections.

10. The method of claim 9, wherein identifying the largest of the preambles in the false alarm detection window comprises determining which of the preambles in the false alarm detection window has largest peak power.

11. The method of claim 9, wherein identifying the largest of the preambles in the false alarm detection window comprises determining which of the preambles in the false alarm detection window has largest signal to interference plus noise ratio.

12. The method of claim 9, wherein identifying preambles transmitted via a random access channel further comprises:
setting a preamble false alarm detection threshold;
comparing to the preamble false alarm detection threshold each of the preambles identified by the preamble detector; and
rejecting each of the preambles that does not exceed the false alarm detection threshold as a false alarm detection.

13. The method of claim 12, wherein setting the preamble false alarm detection threshold comprises setting the false alarm detection threshold as a function of a ratio of average interference plus noise power in the random access channel to a predetermined nominal noise power in the random access channel.

14. The method of claim 12, wherein setting the preamble false alarm detection threshold comprises raising a ratio of average interference plus noise power in the random access channel to predetermined nominal noise power in the random access channel to a power of a ratio of a number of base station receive antennas and an interference weighting factor, wherein the interference weighting factor is a power of 2.

15. The method of claim 9, further comprising setting the preamble false alarm detection window of a first detected preamble as a function of a ratio of measured maximum signal to interference plus noise ratio (SINR) to measured minimum SINR; wherein the maximum SINR is a greatest of a measured SINR of the first detected preamble and a measured SINR of a second detected preamble that is cyclically closest to the first detected preamble; wherein the minimum SINR is minimum smallest of the measured SINR of the first detected preamble and the measured SINR of the second detected preamble.

16. The method of claim 9, further comprising setting the preamble false alarm detection window to a predetermined length responsive to less than a predetermined level of interference being detected on the random access channel; wherein the predetermined length is based on the cyclic prefix length of shared data channels, upper bounded by the search window length.

17. A wireless device, comprising:
a preamble detector configured to identify preambles transmitted via a random access channel of a wireless network, the preamble detector comprising preamble false alarm logic configured to:
set a preamble false alarm detection threshold;
compare to the preamble false alarm detection threshold each of the preambles identified by the preamble detector;
reject each of the preambles that does not exceed the false alarm detection threshold as a false alarm detection;
set a preamble false alarm detection window;
compare, to one another, preambles identified in the false alarm detection window;
identify, based on the comparison, a largest of the preambles in the false alarm detection window; and
reject all but the identified largest of the preambles as a false alarm detection.

18. The wireless device of claim 17, wherein the preamble false alarm logic is configured to set the false alarm detection threshold as a function of a ratio of average interference plus noise power in the random access channel to predetermined nominal noise power in the random access channel.

19. The wireless device of claim 18, wherein the preamble false alarm logic is configured to set the false alarm detection threshold as a ratio of average interference plus noise power in the random access channel to predetermined nominal noise power in the random access channel raised to a power of a ratio of a number of base station receive antennas and an interference weighting factor, wherein the interference weighting factor is a power of 2.

20. The wireless device of claim 17, wherein the preamble false alarm logic is configured to identify the largest of the preambles as the one of the preambles having largest peak power in the false alarm detection window.

21. The wireless device of claim 17, wherein the preamble false alarm logic is configured to identify the largest of the preambles as the one of the preambles having largest signal to interference plus noise ratio in the false alarm detection window.

22. The wireless device of claim 17, wherein the preamble false alarm logic is configured to set the preamble false alarm detection window of a first detected preamble as a function of a ratio of measured maximum signal to interference plus noise ratio (SINR) to measured minimum SINR; wherein the maximum SINR is a greatest of a measured SINR of the first detected preamble and a measured SINR of a second detected preamble that is cyclically closest to the first detected preamble; wherein the minimum SINR is minimum smallest of the measured SINR of the first detected preamble and the measured SINR of the second detected preamble.

23. The wireless device of claim 17, wherein the preamble false alarm logic is configured to set the preamble false alarm detection window to a predetermined length responsive to less than a predetermined level of interference being detected on the random access channel; wherein the predetermined length is based on the cyclic prefix length of shared data channels, upper bounded by the search window length.

* * * * *